United States Patent
Yoshida et al.

(10) Patent No.: US 6,759,507 B1
(45) Date of Patent: Jul. 6, 2004

(54) PROCESS FOR PRODUCING POLYPHENYLENE ETHER

(75) Inventors: Kiyoshi Yoshida, Yokkaichi (JP); Naoto Ohsaki, Yokkaichi (JP); Hiroya Fujii, Yokkaichi (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 0 days.

(21) Appl. No.: 10/019,076

(22) PCT Filed: Apr. 28, 2000

(86) PCT No.: PCT/JP00/02835

§ 371 (c)(1),
(2), (4) Date: Dec. 26, 2001

(87) PCT Pub. No.: WO01/83587

PCT Pub. Date: Nov. 8, 2001

(51) Int. Cl.$^7$ .................. C08G 65/44; C08G 65/46; C08J 3/14
(52) U.S. Cl. .................. 528/491; 528/495; 528/496; 528/499; 528/501; 528/502 R; 528/502 A
(58) Field of Search ................ 528/491, 495, 528/496, 499, 501, 502 R, 502 A

(56) References Cited

U.S. PATENT DOCUMENTS 4,906,700 A    3/1990    Banevicius

FOREIGN PATENT DOCUMENTS

| EP | 0375968 | 7/1990 |
| JP | B-45-35070 | 11/1970 |
| JP | A-3-181423 | 8/1991 |
| JP | 3181423 | 8/1991 |

*Primary Examiner*—Duc Truong
(74) *Attorney, Agent, or Firm*—Sherman & Shalloway

(57) ABSTRACT

At the time of preparing polyphenylene ether resin, there can be separated and recovered efficiently an aromatic compound solvent, amines making an azeotrope with water (hereafter, referred to as 'the amines' for short.) and methanol.

A method for producing polyphenylene ether, which comprises
(a) a step for synthesizing polyphenylene ether by subjecting phenol to oxidative polymerization in the presence of a copper compound and amines in an aromatic compound solvent,
(b) a step for precipitating polyphenylene ether particles by adding methanol into the solution of polyphenylene ether in the aromatic compound solvent obtained by the step (a),
(c) a step for solid-liquid separating a slurry of polyphenylene ether obtained by the step (b), and then washing the separated polyphenylene ether particles with methanol to obtain the polyphenylene ether,
(d) a step for adding water to a filtrate obtained by the step (c) to mix them, and then liquid-liquid separating the mixture into a phase consisting mainly of the aromatic compound and a phase consisting mainly of methanol and water, and
(e) a step for supplying the phase consisting mainly of methanol and water, obtained at the step (d) to the middle portion of a distilled column to perform distillation, and separating out a distillate liquid consisting mainly of methanol, a bottom liquid consisting mainly of water and a side-cut liquid containing the amines by distillation, recycling the distillate liquid consisting mainly of methanol as methanol of the steps (b) and (c), and recycling the side-cut liquid as part of the filtrate of the step (d).

8 Claims, No Drawings

PROCESS FOR PRODUCING POLYPHENYLENE ETHER

TECHNICAL FIELD

The present invention relates to a method for producing polyphenylene ether. More specifically, the present invention relates to a method for producing the polyether that includes recycle use of a solvent.

PRIOR ART

As a method for synthesizing the polyphenylene ether, there is a method of subjecting phenol to oxidative polymerization in the presence of a copper compound and amines such as di-n-buthylamine and the like, in an aromatic compound solvent. A non-solvent for the polyphenylene ether such as methanol, water or the like is added in the above-obtained polyphenylene ether solution to precipitate the polyphenylene ether particles. Then, dry particles of the polyphenylene ether can be prepared through steps such as solid-liquid separation, washing with methanol or the like and dryness.

It surely needs to achieve reduction of the manufacture cost that components used in the above method of preparing the polyphenylene ether, such as the aromatic compound solvent, the amines, methanol or water, are each separated and recovered for every component to reuse. However when di-n-buthylamine is used especially as the amines, it has not been established a method of separating and recovering an aromatic compound solvent, di-n-buthylamine and methanol efficiently and economically.

The present invention has been made to solve the above problems, and the object of the present invention is to provide an industrially advantageous method for producing the polyphenylene ether by separating and recovering efficiently the solvent used in polyphenylene ether production process, such as aromatic compound solvent, amines and methanol.

Other purposes and advantages of the present invention will become clear from the following explanation.

DISCLOSURE OF INVENTION

The present inventors have made extensive studies to solve the above problems, and as a result, have found that it was able to recovered methanol having the low amines content and water by adding water to a mixed solution of the aromatic compound solvent, amines and methanol, separating a phase which consists of the aromatic compound solvent and a large portion of the amines from the mixed solution by liquid-liquid separation, supplying a phase which consists mainly of methanol containing a part of the amines and water to a distillation column, and distilling the phase while carrying out side-cut of the amines. Thus, the present invention has been accomplished.

That is, the present invention is a method for preparing polyphenylene ether comprising the following steps, (a) a step for synthesizing polyphenylene ether by subjecting phenol to oxidative polymerization in the presence of a copper compound and amines in an aromatic compound solvent, (b) a step for precipitating the polyphenylene ether particles by adding methanol to the solution of polyphenylene ether in the aromatic compound solvent obtained by the step (a), (c) a step for solid-liquid separating a slurry of polyphenylene ether obtained by the step (b), and washing the separated polyphenylene ether particles with methanol to obtain the polyphenylene ether, (d) a step for adding water to a filtrate obtained by the step (c) to mix them, and then, liquid-liquid separating the mixture into phase consisting mainly of the aromatic compound and a phase consisting mainly of methanol and water, and (e) a step for supplying the phase consisting mainly of methanol and water, obtained by the step (d), to the middle portion of the distillation column to perform distillation, and separating out a distillate liquid consisting mainly of methanol, a bottom liquid consisting mainly of water and a side-cut liquid comprising the amines by distilling, recycling the distillate liquid consisting mainly of methanol as methanol which is used at the step (b) and (c), and recycling the side-cut liquid as part of the filtrate which is used at the step (d).

EMBODIMENT FOR PRACTICING THE INVENTION

The polyphenylene ether in the present invention is derived from a compound represented by the following formula (1) by oxidative polymerization.

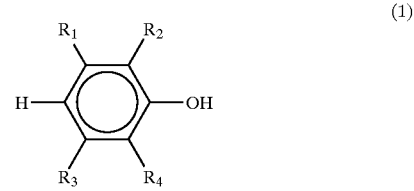

(1)

(wherein $R_1$, $R_2$, $R_3$ and $R_4$ represent independently a substituent selected from the group consisting of a hydrogen atom, an alkyl group, a substituted alkyl group, a halogen atom, an aryl group and a substituted aryl group.)

Examples of polyphenylene ether according to the present invention are a homopolymer such as poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2-methyl-6-n-propyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether; polyphenylene ether copolymer such as 2,6-dimethylphenol copolymerized with 2,3,6-trimethylphenol and/or o-cresol.

The step (a) of the present invention is a step for obtaining the polyphenylene ether by subjecting phenol to oxidative polymerization in the presence of the copper compound and the amines in the aromatic hydrocarbon solvent.

The aromatic hydrocarbon solvent used in the reaction of polymerization is preferably benzene, toluene and xylene, and especially toluene is preferred. The concentration of polyphenylene ether in a solution of polymerization reaction is preferably 5 to 70 wt %, more preferably 10 to 50 wt %. Further, the solution may contain substances for removing catalysts, by-products or the like, other than polyphenylene ether and catalysts for polymerization (the copper compound and the amines).

The step (b) is a step for precipitating the polyphenylene ether particles by adding methanol which is a non-solvent for polyphenylene ether, to the solution of polyphenylene ether in the aromatic compound solvent, obtained by the step (a).

The amount of methanol to be added is preferable 1 to 2 times by weight of the aromatic compound in polyphenylene ether solution. It is desirable further to let water co-exist with a mixture of the aromatic compound solvent and methanol within such a range that the mixture can maintain a single liquid phase. Moreover, when the solution of polymerization reaction is supplied, it is preferred that the polyphenylene ether solution and methanol are continuously supplied into one or more stages of a stirring vessel having a reciprocating stirrer. Further, to decrease the amount of methanol used, it is desirable to supply the polyphenylene ether solution into the stirring vessel while maintaining temperature to the extent that polyphenylene ether does not precipitate after heating and condensing the polyphenylene ether solution.

The step (c) is a step for solid-liquid separating the slurry of polyphenylene ether obtained by the step (b), and then, washing the separated polyphenylene ethers particles with methanol.

As a method of solid-liquid separating the slurry of the polyphenylene ether particles precipitated, for example, there are a method of using a centrifugal force and a vacuum filtration method under reduced pressure. Moreover, not only these but any method scan be used. The solid-liquid separated wet particles of polyphenylene ether were washed with methanol, and dried by heating or the like, to obtain dry particles. Since it is hard to remove the aromatic compound solvent and the amines by drying, if these are not removed from the wet particles by methanol-washing, these will remain in the dry particles and will become cause a stench or the like.

The step (d) is a step for adding water to the filtrate obtained by the step (c), i.e. the filtrate containing the aromatic compound, the amines and methanol, and liquid-liquid separating into a phase consisting mainly of the aromatic compound and a phase consisting mainly of methanol and water.

It is desirable to set up the amount of water to be added so that the weight ratio of water/methanol in the liquid-liquid separated raw solution may be 0.5 to 1.5. Further, as for a method of liquid-liquid separation, there are a stand separation, a centrifugation and a tower system separation or the like. Moreover, not only these but any methods can be used. After most of the aromatic compound and the amines are recovered as the phase consisting mainly of the aromatic compound, if desired, it is fractionated to recycle in a polymerization reaction process.

The step (e) is a step for supplying the phase consisting mainly of methanol and water, obtained by the step (d), i.e. the phase consisting mainly of methanol containing amines, and water to the middle portion of the distillation column, and separating out the distillate liquid consisting mainly of methanol, the bottom liquid mainly consisting of water and the side-cut liquid containing the amines. The phase consisting mainly of methanol and water, to be distilled preferably contains 40 to 60 wt % of methanol, 40 to 60 wt % of water and 0.1 to 0.3 wt % of the amines.

Though both a tray type column and a packed column can be used as the distillation column, the tray type column is desirable because of ease of a side-cut. Moreover, there is no particular restriction in distillation pressure.

The distillate solution consisting mainly of methanol, obtained by distillation is recycled to be used as the non-solvent for precipitating polyphenylene ether in the step (b) or as the liquid for washing the wet particles of polyphenylene ether in the step (c). If the amines in methanol used as the liquid for washing in the step (c) are contained in a high percentage, it will become inadequate to remove the amines in the polyphenylene ether particles. Therefore, it is preferable that the concentration of the amines in the distillate methanol is less than 0.1 wt %.

The bottom liquid consisting mainly of water is recycled as water used in the step (d). To remove the accumulated impurities, it is preferable to discharge at least part of water out of the system. In this case, it is the simplest way to discharge water as drainage, however, when water contains a high percentage of the amines which becomes a source of COD in drainage, drainage disposal will be complicated. Moreover, since the cost increases due to the supplement of the discharged water, it is preferable that the concentration of the amines in the bottom liquid is less than 0.01 wt %.

To maintain the concentration of the amines in the distillate solution and bottom solution less than a certain concentration in the step (e), the solution containing the amines is extracted from the middle portion of the distillation column as the side-cut liquid. It is desirable to set the position for extracting the side-cut liquid so that the concentration of the amines in the side-cut liquid becomes as high as possible. Further, it is desirable to set the extracted amount so that it is 0.5 to 5 wt.% of the phase consisting mainly of methanol and water, to be distilled. The side-cut liquid is returned to the step (d). Therefore, the most of the amines distributed to the phase consisting mainly of methanol and water in the step (d) circulates between the step (d) and (e), and as a result, the amines which are discharged as the bottom liquid can be held down in a very little.

For the purpose of effective distilling and the like, an anti-foaming agent or sodium hydroxide can be added into the phase consisting mainly of methanol and water, to be distilled in the step (e). In this case, to avoid returning the additive to the step (d), it is desirable to carry out side-cut from between the tray supplying a material solution and the top of the distillation column.

Examples of the amines of the present invention include the amines making an azeotrope with water such as di-n-butylamine, n-buthyldimethylamine and the like.

EXAMPLES

The following examples illustrate the present invention more specifically, but are in no way to be taken as limiting the invention.

Example 1

Two kilograms of cupric bromide was dissolved in 35 kg of di-n-buthylamine and 800 kg of toluene. A solution in which 200 kg of 2,6-dimethylphenol was dissolved in 500 kg of toluene was added to this catalytic solution. This mixed solution was subjected to polymerization at 40° C. for 3 hours while supplying oxygen into a reactor. After the reaction stopped, the solution was contacted with water to remove the catalyst from the reaction solution, and the polymerization reaction solution of polyphenylene ether was obtained. This polyphenylene ether solution was mixed while stirring with methanol of 1.5 times by weight of toluene in the solution, to precipitate the polyphenylene ether particles. Then, the solution was separated by a solid-liquid separator, and a wet solid was washed with methanol of 5 times by weight of polyphenylene ether in the wet solid. Water was added to the solid-liquid separated filtrate so that the weight ratio of water/methanol after addition might be 1.0, and the solution was subjected to stand separation to obtain a phase of toluene and a phase consisting mainly of methanol and water. When distillation was perform, while carrying out side-cut, by using this phase consisting mainly of methanol and water as a material under conditions shown in Table 1, the distillate and the bottom liquid having the low concentration of di-n-buthylamine was obtained. The result was shown in Table 1.

TABLE 1

| | Stages | FlowRate (g/h) | Composition (wt %) | | | |
|---|---|---|---|---|---|---|
| | | | ME | TL | DBA | water |
| Supplied Liquid | 20 | 661 | 50.1 | 1.7 | 0.2 | 48.0 |
| Distilled Liquid | 1 | 338 | 95.3 | 3.4 | 0.02 | 1.3 |
| Bottom Liquid | 40 | 305 | 0.02 | <0.01 | <0.01 | 99.98 |
| Side-cut Liquid | 15 | 13 | 43.2 | 0.1 | 9.6 | 47.1 |

ME: methanol
TL: toluene
DBA: di-n-buthylamine

Comparative Example 1

An experiment was carried out under the same conditions as Example 1 except that distillation was perform, without carrying out side-cut, by using the phase consisting mainly of methanol and water as a material under conditions shown in Table 2. The concentration of di-n-buthylamine in the distillate liquid and bottom liquid obtained by distillation, increased remarkably as compared with Example 1. In addition, the temperature of each stage of the distillation column was also unstable. The result was shown in Table 2.

TABLE 2

| | Stages | FlowRate (g/h) | Composition (wt %) | | | |
|---|---|---|---|---|---|---|
| | | | ME | TL | DBA | water |
| Supplied Liquid | 20 | 655 | 50.1 | 1.7 | 0.2 | 48.0 |
| Distillate Liquid | 1 | 335 | 95.4 | 3.1 | 0.18 | 1.3 |
| Bottom Liquid | 40 | 320 | 0.04 | <0.01 | 0.22 | 99.74 |

ME: methanol
TL: toluene
DBA: di-n-buthylamino

According to the present invention, the aromatic compound solvent used for the production of polyphenylene ether, the amines making the azeotrope with water, and methanol can be separated and collected efficiently, and polyphenylene ether having low concentration of residual solvent can be produced at lower cost.

What is claimed is:

1. A method for producing polyphenylene ether, which comprises
    (a) a step for synthesizing polyphenylene ether by subjecting phenol to oxidative polymerization in the presence of a copper compound and amines in an aromatic compound solvent,
    (b) a step for precipitating polyphenylene ether particles by adding methanol into the solution of polyphenylene ether in the aromatic compound solvent obtained by the step (a),
    (c) a step for solid-liquid separating a slurry of polyphenylene ether obtained by the step (b), and then washing the separated polyphenylene ether particles with methanol to obtain the polyphenylene ether,
    (d) a step for adding water to a filtrate obtained by the step (c) to mix them, and then liquid-liquid separating the mixture into a phase consisting mainly of the aromatic compound and a phase consisting mainly of methanol and water, and
    (e) a step for supplying the phase consisting mainly of methanol and water, obtained at the step (d) to the middle portion of a distilled column to perform distillation, and separating out a distillate liquid consisting mainly of methanol, a bottom liquid consisting mainly of water and a side-cut liquid containing the amines by distillation, recycling the distillate liquid consisting mainly of methanol as methanol of the steps (b) and (c), and recycling the side-cut liquid as part of the filtrate of the step (d).

2. The method of claim 1, wherein the amines are amines which make an azeotrope with water.

3. The method of claim 1, wherein the amount of methanol added at the step (b) is 1 to 2 times by weight of the aromatic compound in the solution.

4. The method of claim 1, wherein water is added so that the weight ratio of water/methanol in the liquid-liquid separated raw material solution in the step (d) is 0.5 to 1.5.

5. The method of claim 1, wherein the phase consisting mainly of methanol and water, to be distilled in the step (e) contains 40 to 60 wt % of methanol, 40 to 60 wt % of water and 0.1 to 0.3 wt % of the amines.

6. The method of claim 1, wherein the amount of side-cut liquid is 0.5 to 5 wt % based on the phase consisting mainly of methanol and water, to be distilled.

7. The method of claim 1, the concentration of the amines in the distillate solution in the step (e) is less than 0.1 wt % and the concentration of the amines in the bottom liquid is less than 0.01 wt %.

8. The method of claim 1, wherein an anti-foaming agent and/or sodium hydroxide are/is added to the phase consisting mainly of methanol and water, to be distilled in the step (e), and carrying out side-cut between the stage supplying a raw material and the top of the distillation column.

* * * * *